No. 703,628.  
T. D. VANATA.  
ANIMAL TRAP.  
(Application filed Mar. 7, 1902.)  
Patented July 1, 1902.
(No Model.)  
2 Sheets—Sheet 1.
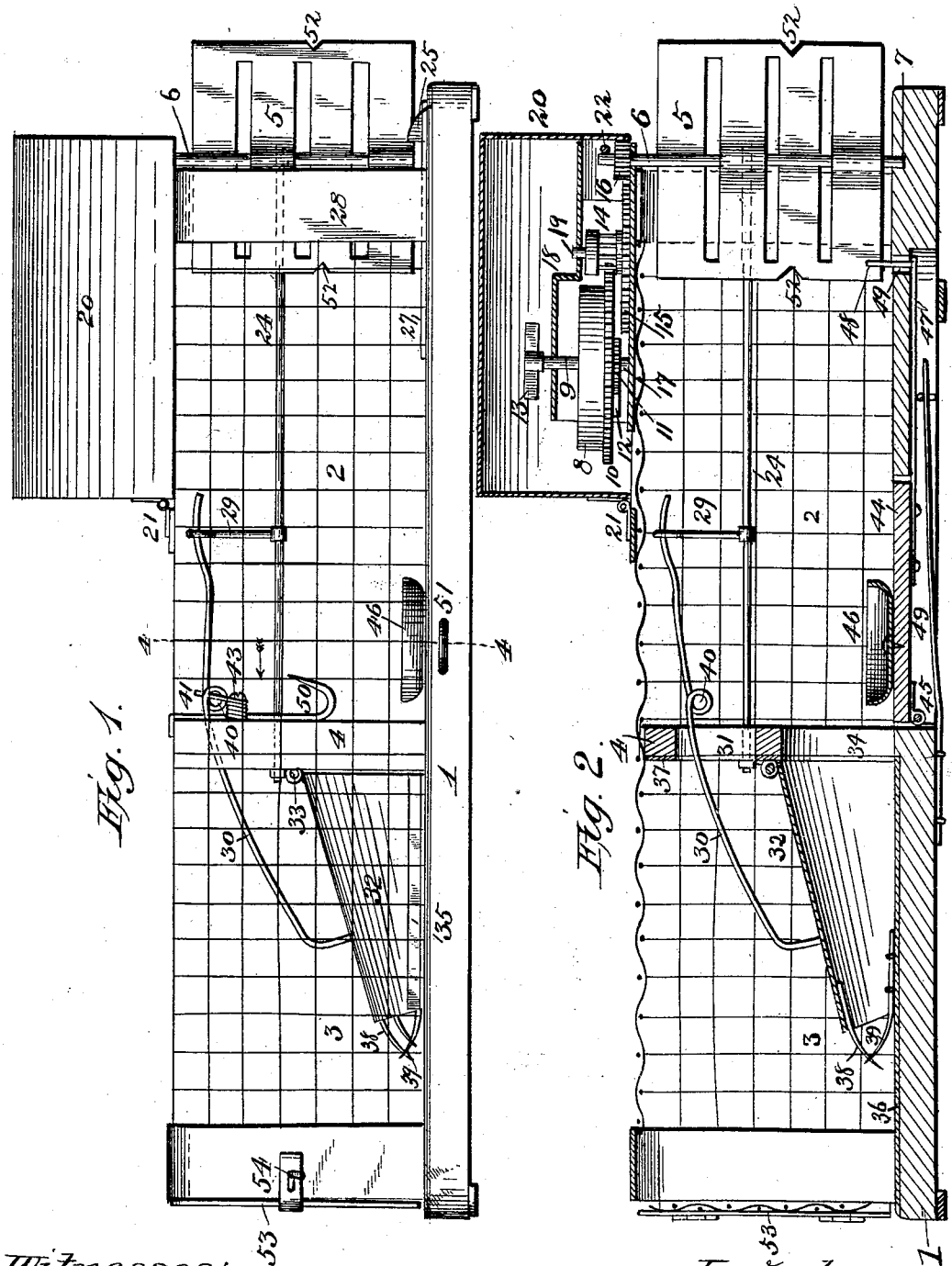
Witnesses:  
Franck L. Durand.  
W. Parker Reinohl.
Inventor:  
Thomas D. Vanata.  
By D. L. Reinohl  
Attorney.

No. 703,628. Patented July 1, 1902.
T. D. VANATA.
ANIMAL TRAP.
(Application filed Mar. 7, 1902.)
(No Model.) 2 Sheets—Sheet 2.
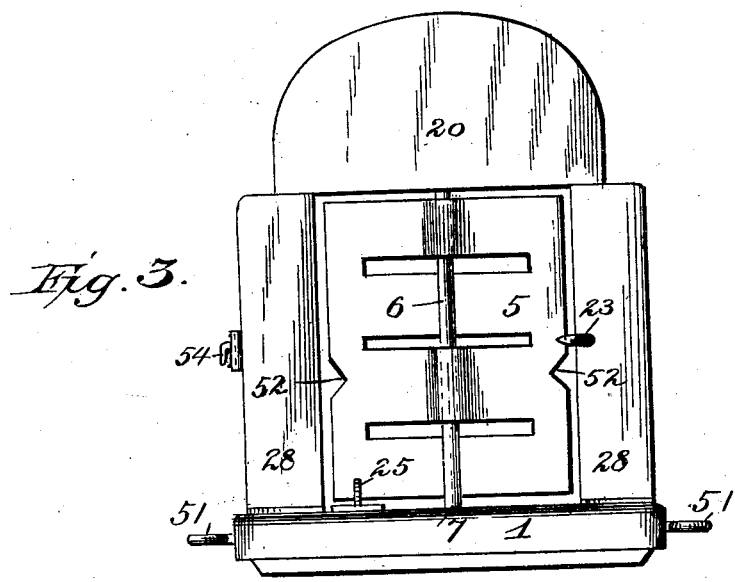
Fig. 3.
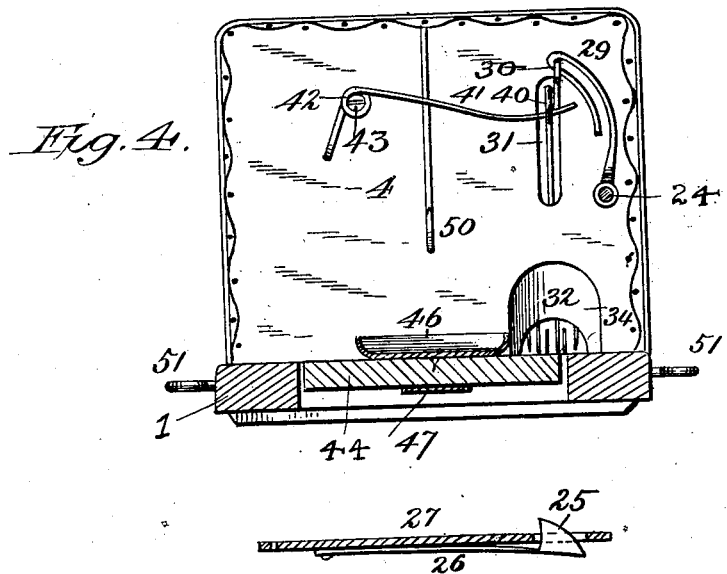
Fig. 4.
Fig. 5.
Witnesses:
Franck L. Durand,
W. Parker Reinohl.
Inventor:
Thomas D. Vanata,
By D. L. Reinohl
Attorney.

UNITED STATES PATENT OFFICE.

THOMAS D. VANATA, OF WASHINGTON, DISTRICT OF COLUMBIA, ASSIGNOR OF ONE-HALF TO WILLIAM W. GRANT, OF WASHINGTON, DISTRICT OF COLUMBIA.

ANIMAL-TRAP.

SPECIFICATION forming part of Letters Patent No. 703,628, dated July 1, 1902.

Application filed March 7, 1902. Serial No. 97,086. (No model.)

*To all whom it may concern:*

Be it known that I, THOMAS D. VANATA, a citizen of the United States, residing at Washington, in the District of Columbia, have invented certain new and useful Improvements in Animal-Traps; and I do hereby declare the following to be a full, clear, and exact description of the invention, such as will enable others skilled in the art to which it appertains to make and use the same.

My invention relates to animal-traps, has especial reference to that class of traps in which the victim or animal caught sets the trap for another animal, and in which trap animals are caught alive and without injury to the animals.

The invention has for its object a safe, sure, and sensitive trap; and it consists in certain improvements in construction, which will be fully disclosed in the following specification and claims.

In the accompanying drawings, which form part of this specification, Figure 1 represents a side elevation of my improved trap, showing the trap set; Fig. 2, a vertical longitudinal section, partly in side elevation; Fig. 3, an end elevation showing the entrance to the trap closed; Fig. 4, a vertical transverse section on line 4 4, Fig. 1, looking in the direction of the arrow; and Fig. 5 a side elevation of the spring-catch for securing the door when closed.

Reference being had to the drawings and the numerals thereon, 1 indicates the bottom of the trap, which trap is separated into two compartments 2 and 3 by a vertical transverse partition 4, the former being the baiting-compartment and the latter the prison, from which there is no escape. The compartment 2 is provided with a door 5, supported upon and attached to a post 6, having a seat 7 in the bottom 1, as shown in Fig. 1, the post passing through the transverse center of the door and forming a pivot upon which the door revolves and affording a passage-way into the compartment 2 on each side of the door, so that more than one animal can enter the trap at the same time without interfering with each other.

The door is operated by a spring-motor consisting of a volute spring 8, supported upon and secured to a post 9 at one end and to which post a master gear-wheel 10 is secured, and the opposite end of the spring is secured to the plate 18 in any preferred manner, and secured to the post 9 is a ratchet-wheel 11, engaged by a pawl 12, secured to said gear-wheel, and the spring is wound by a key 13. The wheel 10 engages a pinion 14, which is secured to a gear-wheel 15, which engages a pinion 16 on the upper end of the post 6, the whole constituting part of a clock mechanism so far as the several parts are assembled, and the multiplication of gearing is designed to close the door positively, but noiselessly, as compared with the application of the spring directly to the post 6. These several parts are supported on a plate 17 and by a plate 18, which engages the post 9 and the post 19 of the pinion 14, and the whole is inclosed by a hood 20, having hinges 21 to afford access thereto for winding the spring 8. The hood affords protection to the motor against interference by animals, the elements, or falling branches of trees or other objects. The door-post 6 is further supported at its upper end by a rod 22, as shown in Fig. 2, and when closed the door is secured by a latch 23 at the outer end of a rod 24 and by a spring-catch 25 in the bottom of the trap, the catch being secured to one end of a spring 26, which is secured to the under side of plate 27 and set in a recess in the bottom 1.

On the end of the compartment 2 are right-angled door jambs or frames 28 28, in one of which the rod 24 is supported at one end, while its opposite end is supported in the transverse partition 4, and on the rod 24, which oscillates or turns on its axis one-fourth of a revolution, is a curved and slotted lever 29, engaged by the rear end of rod 30, which extends through the slot 31 in partition 4 and is connected to the hood 32, which is hinged to the partition 4 at 33 and forms a runway from the passage 34, leading from compartment 2 into compartment 3, and the hood is secured against being raised by the imprisoned animal or lateral displacement by flanges 35, secured to the bottom 1, one on each outer side of the hood, though only one is shown in Fig. 1.

The bottom of compartment 3 and the side of the partition 4, forming one end of said compartment, are covered with sheet metal 36 and 37 to prevent gnawing or cutting through them by entrapped animals, and at the inner end of the hood are sharp barbs 38 and barbs 39, secured to the bottom 1, to prevent an animal raising the hood to escape.

In the rod 30 is an eye 40, which is engaged by an arm 41 of spring 42 for the purpose of assisting in seating the hood as an animal passes under it and for holding the hood down to its seat. The spring 42 is secured to the partition 4 by a screw 43.

In the bottom floor of the compartment 2 is a section 44, hinged at 45 to move downward, and said section supports a bait-receptacle 46 for meal or other food and has secured to its under side an arm 47, supporting a stud or pin 48, which projects through a hole 49 in the bottom 1 and engages the door 5 to hold it open when the trap is set until released by an animal getting on the section 44, which depresses the stud 48, when the spring-motor revolves and closes the door 5 and entraps the animal in compartment 2. The animal in attempting to escape from compartment 2 passes through passage 34, raises the hood 32, and resets the trap by releasing the latch 23.

50 indicates a bait-hook, and 51 51 are eye-bolts in the sides of the bottom 1 to anchor the trap by suitable pins or stakes.

52 52 are notches in the door 5 to allow the door to pass the latch 23 on rod 24 with as little movement of the latch as possible to render the trap very sensitive, and 53 is a door in the outer end of compartment 3 for the removal of the imprisoned animal, and the door is secured by a latch 54.

Having thus fully described my invention, what I claim is—

1. An animal-trap having a baiting-compartment provided with a pivotally-supported door, a prison-compartment provided with a vertically-movable hood, a transverse partition between said compartments, a vertically-movable rod and an oscillatory rod forming connections between said door and said hood for releasing the door and resetting the trap, and means connected to the pivoted support of the door for opening and closing said door.

2. An animal-trap having vertical door-jambs, a vertical and revoluble door supported between said jambs and provided with notches in the edges thereof, an oscillatory rod supported in one of said jambs and having a latch thereon engaging said door, and the rod provided with a curved and slotted lever, a movable hood having a rod thereon engaging said slotted lever, and a spring connected to rod extending from the hood.

3. An animal-trap provided with a door, a latch engaging said door outside the trap, a vertically-movable hood having a vertically-movable rod attached thereto and connected to said latch to lock the door on one side and release the door and reset the trap, a spring engaging said rod, and means for opening and closing the door.

4. An animal-trap provided with a revoluble door, a stud projecting through the bottom of the trap for locking the door in open position, a movable section in the bottom of the trap to which said stud is connected to release the door by the weight of an animal, a movable hood, and a latch engaging the door outside the trap and operated by the animal to release the door and reset the trap.

5. An animal-trap having a revoluble door, a latch on one side of the center thereof operated by an animal, a spring-catch in the bottom of the trap and on the opposite side of the center, a stop in the bottom of the trap to hold the door open, a movable section in the bottom of the trap to which said stop is connected to release the door by the weight of an animal, a runway formed by a movable hood, and connections with said hood to reset the trap.

6. An animal-trap provided with a movable hood forming a runway and having barbs at the outer end thereof, barbs secured to the floor of the trap at the outer end of the runway, and flanges secured to the bottom of the trap on the outer sides of the hood to prevent raising or lateral displacement thereof.

In testimony whereof I affix my signature in presence of two witnesses.

THOMAS D. VANATA.

Witnesses:
D. C. REINOHL,
W. PARKER REINOHL.